United States Patent
Sims

(10) Patent No.: US 11,489,952 B1
(45) Date of Patent: Nov. 1, 2022

(54) SMART DEVICE HOLDER ASSEMBLY

(71) Applicant: Paul Sims, Jackson, TN (US)

(72) Inventor: Paul Sims, Jackson, TN (US)

( * ) Notice: Subject to any disclaimer, the term of this patent is extended or adjusted under 35 U.S.C. 154(b) by 0 days.

(21) Appl. No.: 17/361,607

(22) Filed: Jun. 29, 2021

(51) Int. Cl.
*F16M 11/38* (2006.01)
*A47B 23/00* (2006.01)
*H04M 1/04* (2006.01)

(52) U.S. Cl.
CPC .............. *H04M 1/04* (2013.01); *F16M 11/38* (2013.01); *A47B 23/001* (2013.01)

(58) Field of Classification Search
USPC .... 248/158, 160, 161, 162.1, 411, 415, 416, 248/157, 181.1, 182.1, 188.6, 123.11, 248/123.2, 125.8, 125.9
See application file for complete search history.

(56) References Cited

U.S. PATENT DOCUMENTS

| | | | |
|---|---|---|---|
| 4,843,662 A * | 7/1989 | Handelman | A47C 7/021 297/382 |
| 5,611,098 A * | 3/1997 | Skibik | A47B 23/002 5/653 |
| 5,615,856 A * | 4/1997 | Simington | A47B 23/046 248/463 |
| D744,971 S | 12/2015 | Kamp | |
| 10,172,468 B2 * | 1/2019 | Houghson | F16M 11/28 |
| 2002/0078862 A1 * | 6/2002 | Bieza | A47B 23/02 108/43 |
| 2006/0273634 A1 | 12/2006 | Kaloustian | |
| 2013/0078855 A1 | 3/2013 | Hornick | |
| 2013/0098852 A1 | 4/2013 | Lausell | |
| 2013/0152828 A1 * | 6/2013 | Chavira | F16M 11/2092 108/12 |
| 2014/0265752 A1 | 9/2014 | Caine | |
| 2017/0086314 A1 * | 3/2017 | Simon | F16M 11/28 |

FOREIGN PATENT DOCUMENTS

WO    WO2012094069    7/2012

* cited by examiner

*Primary Examiner* — Alfred J Wujciak

(57) ABSTRACT

A smart device holder assembly includes a base that has a pair of foldable sections that is each positionable in a flattened position for positioning beneath cushions on an article of furniture. An arm is coupled to and extends away from the base to extend upwardly between a respective pair of cushions on the article of furniture when the base is positioned beneath the cushions. The arm has a first portion that is pivotally coupled to the second portion such that the first portion is positionable at a variety of angles with respect to the second portion. A holder is movably disposed on the arm to hold a smart device in a preferred orientation above the cushions on the article of furniture.

4 Claims, 6 Drawing Sheets

SMART DEVICE HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holder devices and more particularly pertains to a new holder device for holding a smart device above cushions on an article of furniture. The device includes a base that is comprised of foldable sections that can be positioned beneath cushions on an article of furniture. Additionally, an arm is coupled to the base and a holder is coupled to the arm for holding a smart device over the cushions.

(2) Description of Related Art Including Information Disclosed Under 37 CFR 1.97 and 1.98

The prior art relates to holder devices including a laptop stand that is attachable to a member of a chair. The prior art discloses a smart device holder that includes a universal joint. The prior art discloses a smart device holder that includes an arm with a pivotable joint, a holder that is attached to the arm for holding a smart device and a box into which the arm can be folded for storage.

BRIEF SUMMARY OF THE INVENTION

An embodiment of the disclosure meets the needs presented above by generally comprising a base that has a pair of foldable sections that is each positionable in a flattened position for positioning beneath cushions on an article of furniture. An arm is coupled to and extends away from the base to extend upwardly between a respective pair of cushions on the article of furniture when the base is positioned beneath the cushions. The arm has a first portion that is pivotally coupled to the second portion such that the first portion is positionable at a variety of angles with respect to the second portion. A holder is movably disposed on the arm to hold a smart device in a preferred orientation above the cushions on the article of furniture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
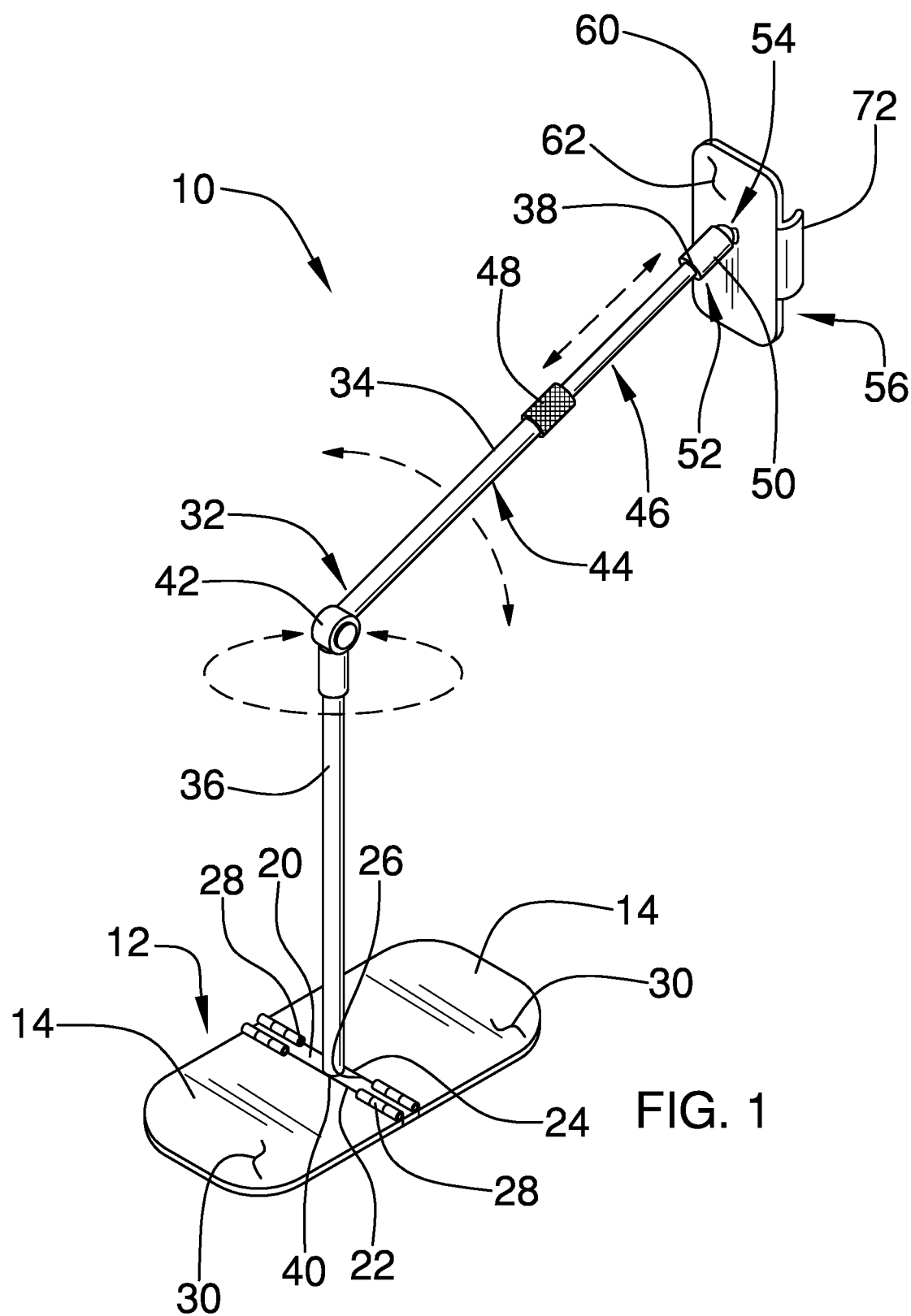
FIG. 1 is a perspective view of a smart device holder assembly according to an embodiment of the disclosure.
Figure 2:
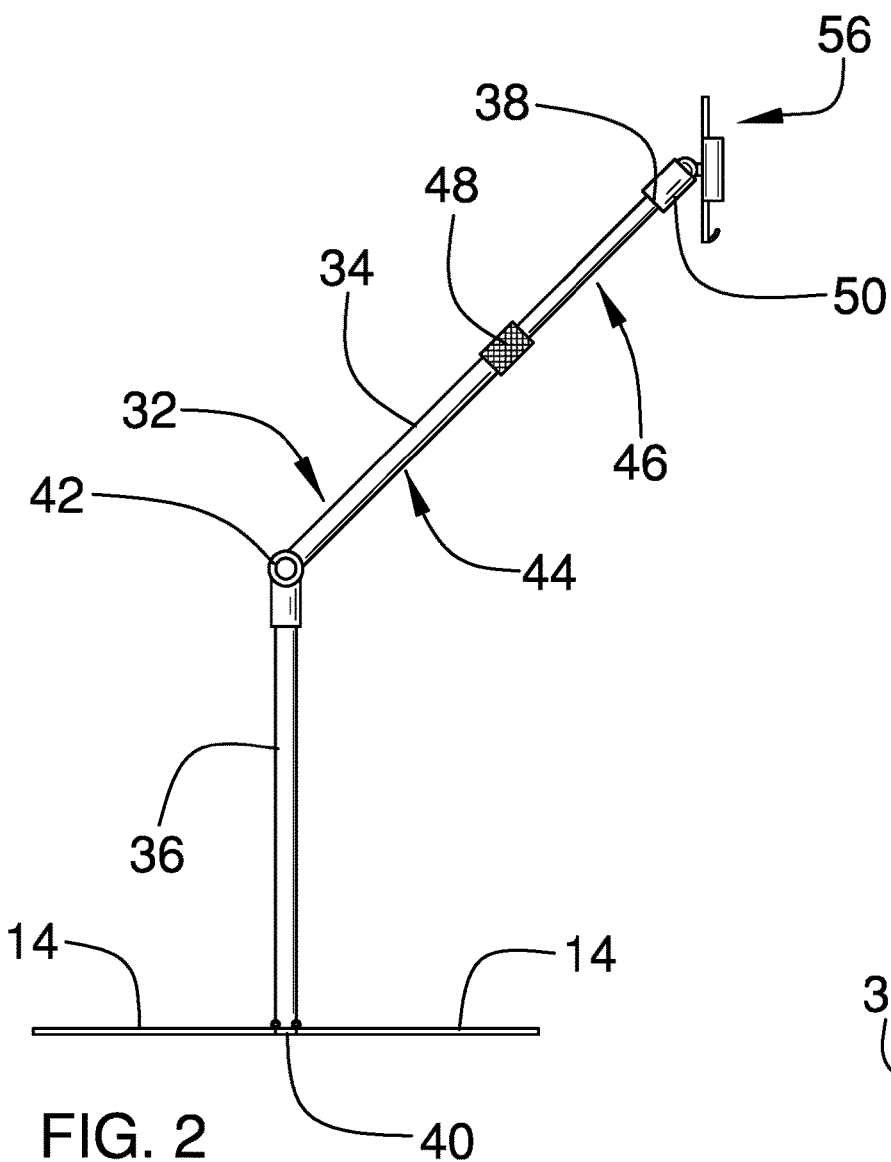
FIG. 2 is a left side view of an embodiment of the disclosure.
Figure 3:
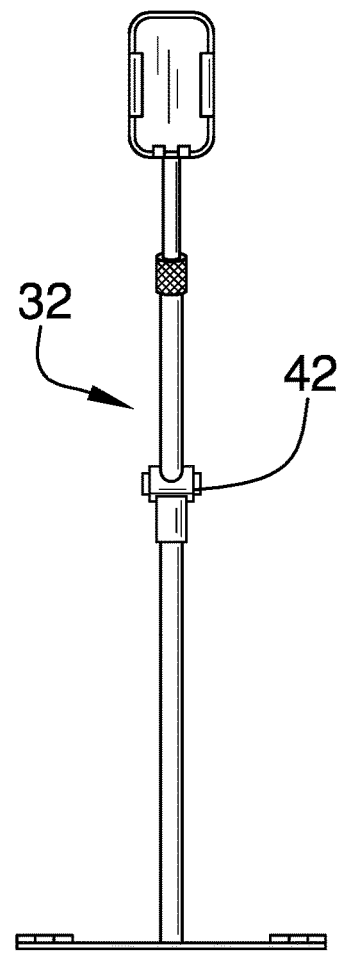
FIG. 3 is a front view of an embodiment of the disclosure.
Figure 4:
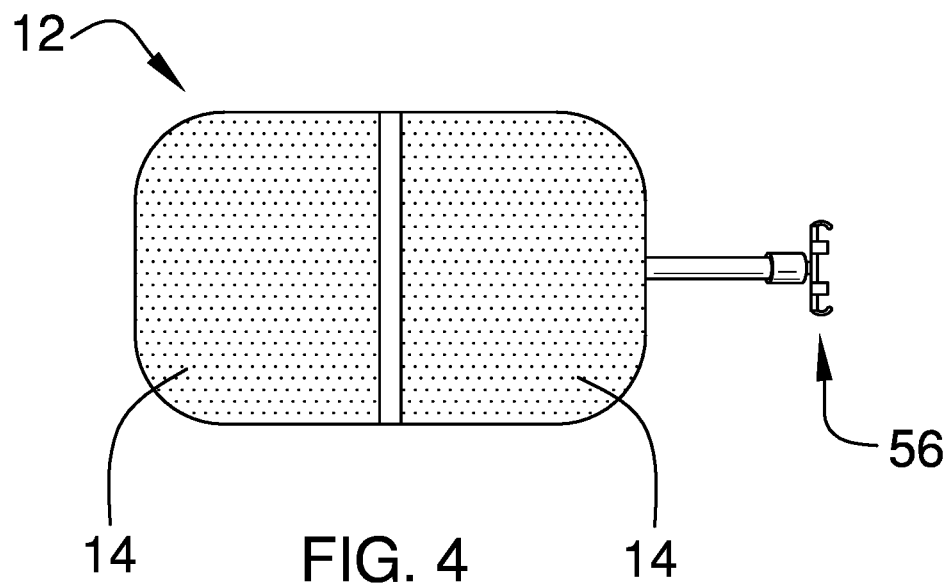
FIG. 4 is a bottom view of an embodiment of the disclosure.

With reference now to the drawings, and in particular to FIGS. 1 through 9 thereof, a new holder device embodying the principles and concepts of an embodiment of the disclosure and generally designated by the reference numeral 10 will be described.

As best illustrated in FIGS. 1 through 9, the smart device holder assembly 10 generally comprises a base 12 that has a pair of foldable sections 14 that is each positionable in a flattened position. In this way the base 12 can be positioned beneath cushions 16 on an article of furniture 18. The base 12 includes a central portion 20 that has a first lateral edge 22, a second lateral edge 24 and a top surface 26, and each of the foldable sections 14 has a first sidelong edge 28 and an upper surface 30. The first sidelong edge 28 of each of the foldable sections 14 is hingedly coupled to a respective one of the first lateral edge 22 and the second lateral edge 24. The upper surface 30 of each of the foldable sections 14 lies on a plane that is coplanar with the top surface 26 of the central portion 20 when the foldable sections 14 are positioned in the flattened position. Conversely, each of the foldable sections 14 extends upwardly from the central portion 20 when the foldable sections 14 are positioned in a folded position. The article of furniture 18 may be a couch, a loveseat, a recliner or other type of sitting furniture 18 that has at least one removable cushion.

An arm 32 is coupled to and extends away from the base 12 such that the arm 32 extends upwardly between a respective pair of cushions 16 on the article of furniture 18 when the base 12 is positioned beneath the cushions 16. The arm 32 has a first portion 34 that is pivotally coupled to the second portion 36 such that the first portion 34 is positionable at a variety of angles with respect to the second portion 36. The arm 32 has a first end 38 and a second end 40; the first end 38 is associated with the first portion 34 and the second end 40 is associated with the second portion 36. The arm 32 includes a pivot 42 that is coupled between each of the first portion 34 and the second portion 36. Moreover, the pivot 42 is rotatably disposed on the second portion 36 thereby facilitating the first portion 34 to be rotated about a longitudinal axis of the second portion 36. The second end 40 is coupled to the top surface 26 of the central portion 20 of the base 12 having the second portion 36 being oriented perpendicular to the top surface 26. In this way the second portion 36 extends upwardly between the respective pair of cushions 16.

The first portion 34 comprises a first half 44 that slidably receives a second half 46 such that the first portion 34 has a telescopically adjustable length. The first portion 34 includes a sleeve 48 that is coupled between the first half 44 and the second half 46. The sleeve 48 frictionally engages the first portion 34 and the second portion 36 when the sleeve 48 is rotated in a tightening direction for retaining the first portion 34 at a desired length. The sleeve 48 is disengaged from the first half 44 and the second half 46 when the sleeve 48 is rotated in a loosening direction to facilitate the first portion 34 to be lengthened or shortened.

A universal joint 50 is included that has a primary portion 52 which movably engages a secondary portion 54. Additionally, the primary portion 52 is coupled to the first end 38 of the first portion 34 of the arm 32. The primary portion 52 may comprise a cup and the secondary portion 54 may comprise a ball that is rotatably positioned in the cup. Additionally, the universal joint 50 may have 180.0 degrees of rotation.

A holder 56 is provided and the holder 56 is movably disposed on the arm 32 to hold a smart device 58 in a preferred orientation above the cushions 16 on the article of furniture 18. The smart device 58 may be a smart phone, an electronic tablet or other similar device that has an electronic display. The holder 56 comprises a panel 60 that has a first surface 62, a second surface 64 and a perimeter edge 66, and the perimeter edge 66 has a first lateral side 68 and a second lateral side 70. The secondary portion 54 of the universal joint 50 is coupled to the first surface 62 of the panel 60 and the smart device 58 is positioned against the second surface 64.

Figure 5:
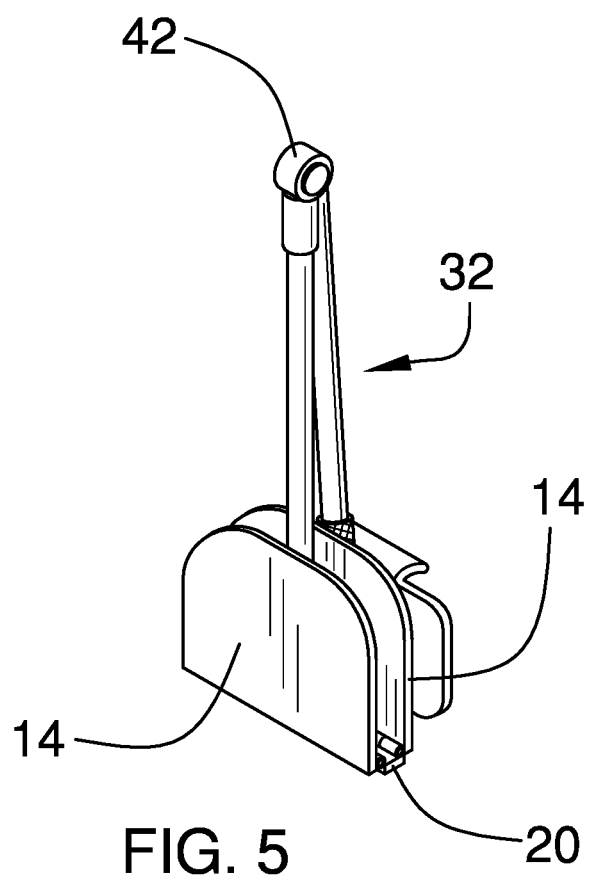
FIG. 5 is a perspective view of an embodiment of the disclosure showing an arm and base being folded.
Figure 6:
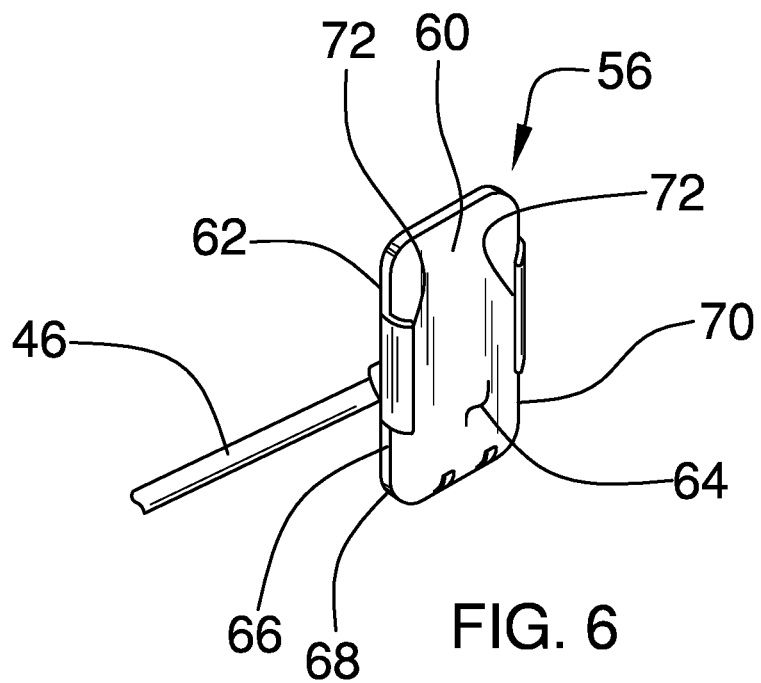
FIG. 6 is a perspective view of a holder of an embodiment of the disclosure.
Figure 7:
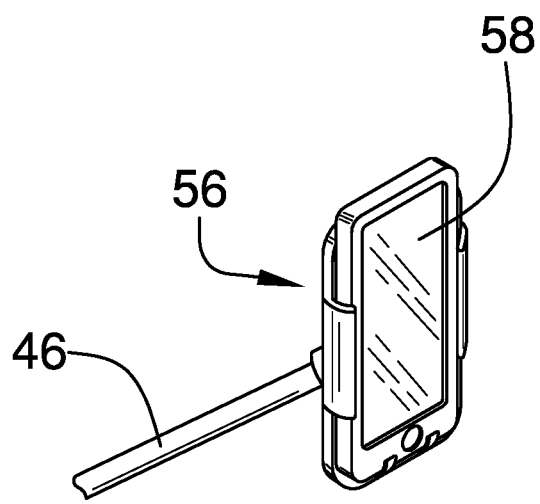
FIG. 7 is a perspective view of an embodiment of the disclosure showing a smart device positioned in a holder.

The panel 60 has a pair of clips 72 that is each disposed on a respective one of the first lateral side 68 and the second lateral side 70 of the perimeter edge 66. Each of the clips 72 extends away from the second surface 64 of the panel 60 to releasably engage the smart device 58 and retain the smart device 58 on the holder 56. Additionally, each of the clips 72 curves toward each other thereby facilitating each of the clips 72 to be biased into a gripping condition. Each of the clips 72 may be comprised of a resiliently bendable material to facilitate the clips 72 to be urged away from each other for removing the smart device 58 from the holder 56. As is shown in FIG. 5, the foldable sections 14 can be positioned in the folded position and the arm 32 can be folded against the base 12 for storage.

Figure 8:
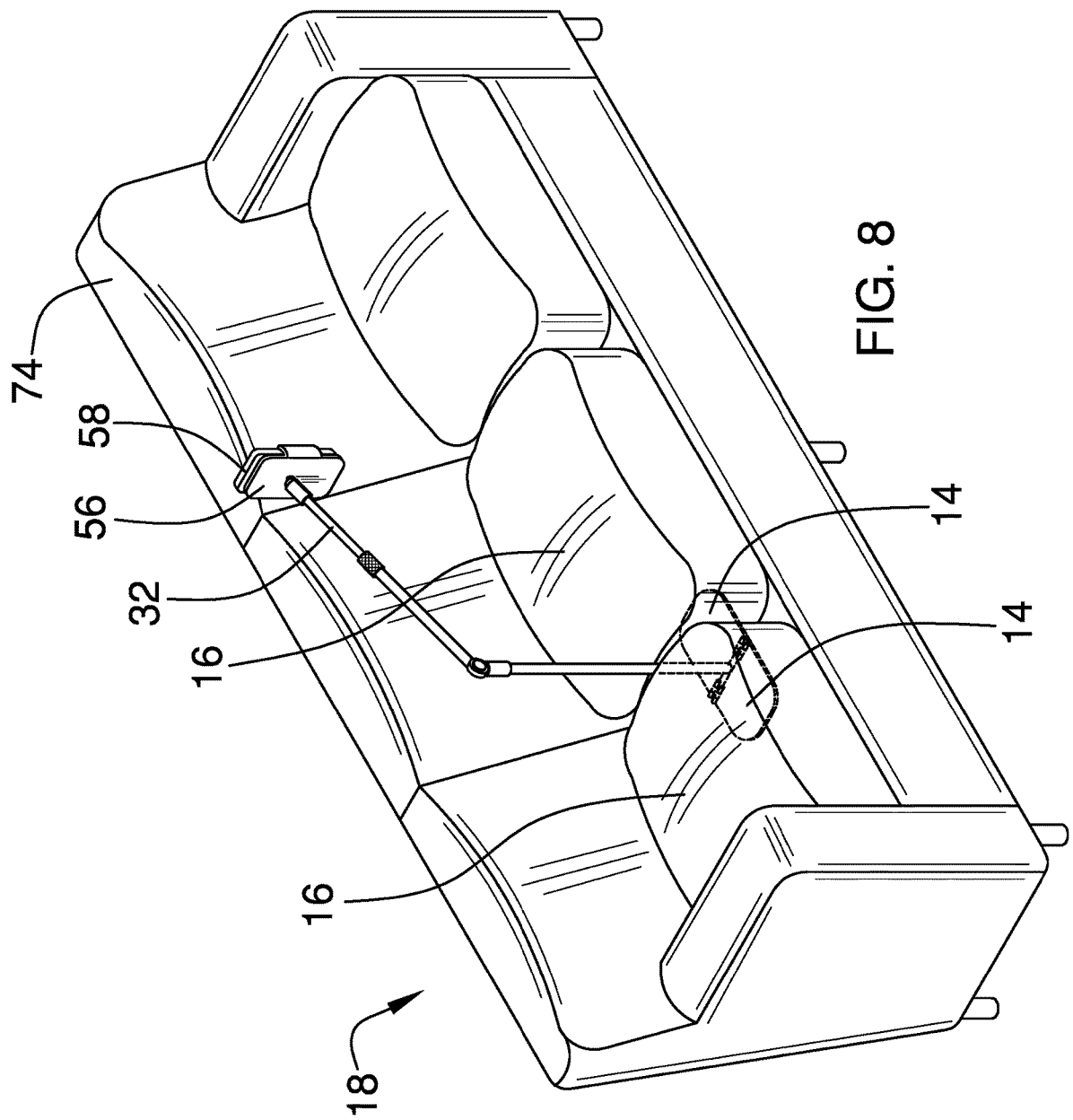
FIG. 8 is a perspective in-use view of an embodiment of the disclosure showing a base being positioned beneath cushions on an article of furniture.
Figure 9:
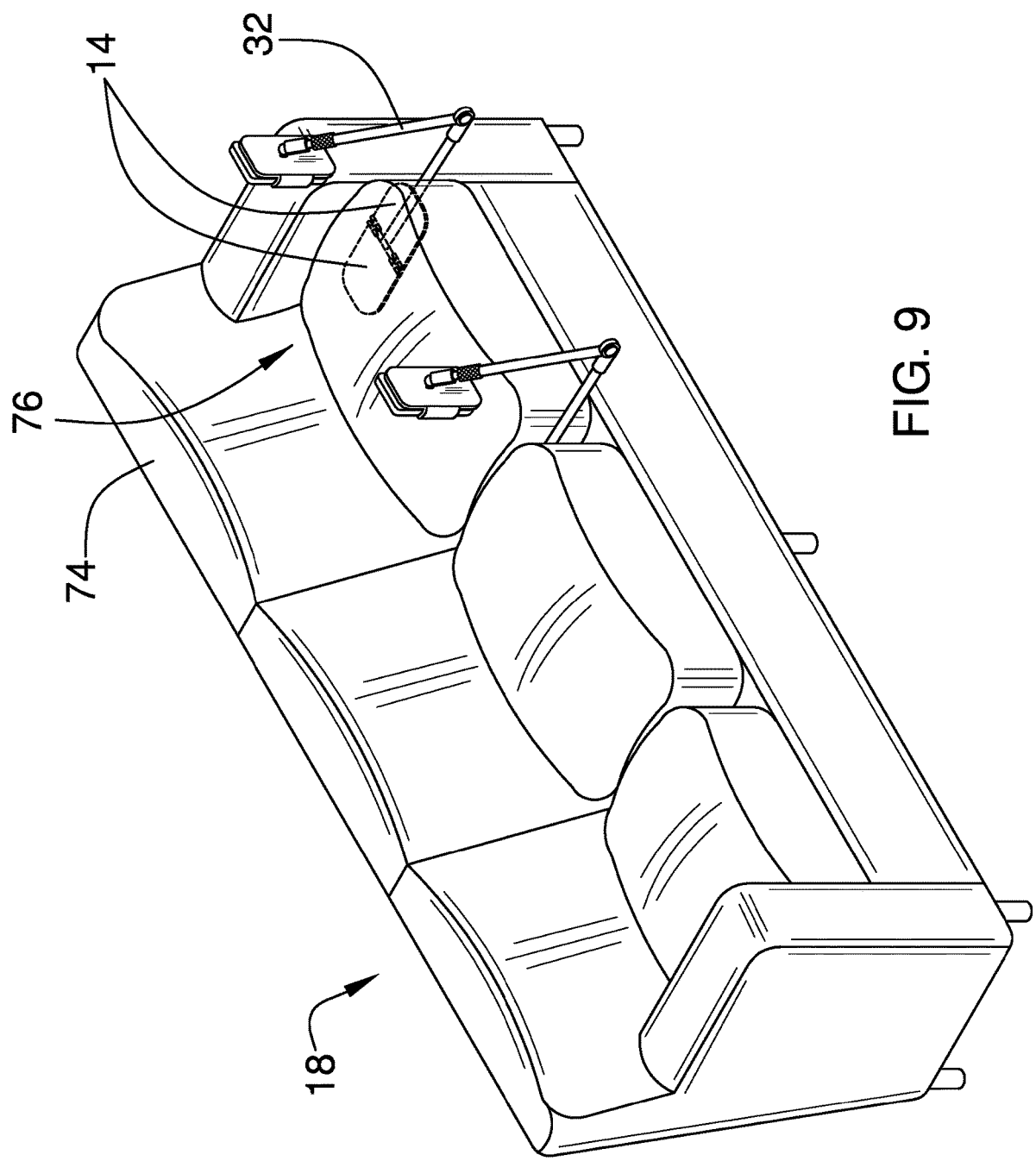
FIG. 9 is a perspective in-use view of an embodiment of the disclosure showing a base being positioned in a corner of an article of furniture.

As is most clearly shown in FIG. 8, each of the foldable sections 14 is positioned in the flattened position and each of the foldable sections 14 is positioned beneath a respective cushion 16 on the article of furniture 18. As is most clearly shown in FIG. 9, each of the foldable sections 14 can be positioned between the respective cushion 16 and a backrest 74 of the article of furniture 18. In this way the arm 32 can extend horizontally between the cushions 16. As is additionally shown in FIG. 9, one of the foldable sections 14 can be positioned in the folded position and one of the foldable sections 14 can be positioned in the flattened position. In this way the base 12 can be positioned in a corner 76 of the article of furniture 18.

In use, the base 12 is positioned beneath or behind the respective cushions 16, depending on the user's preference, such that that the arm 32 extends between the respective cushions 16. The smart device 58 is positioned in the holder 56 and the first portion 34 of the arm 32 is positioned at a desired angle to orient the smart device 58 in a suitable position for viewing. Additionally, the panel 60 can be tilted on the universal joint 50 to facilitate additional positional adjustment of the smart device 58. In this way the smart device 58 can be employed in a hands-free manner while sitting on the article of furniture 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart device holder assembly for holding a smart device on a cushioned article of furniture, said assembly comprising:

a base having a pair of foldable sections, each of said foldable sections being positionable in a flattened position wherein said base is configured to be positioned beneath cushions on an article of furniture;

an arm being coupled to and extending away from said base wherein said arm is configured to extend upwardly between a respective pair of cushions on the article of furniture when said base is positioned beneath the cushions, said arm having a first portion being pivotally coupled to a second portion such that said first portion is positionable at a variety of angles with respect to said second portion;

a holder being movably disposed on said arm wherein said holder is configured to hold a smart device in a preferred orientation above the cushions on the article of furniture;

wherein said base includes a central portion having a first lateral edge, a second lateral edge and a top surface, each of said foldable sections having a first sidelong edge and an upper surface, said first sidelong edge of each of said foldable sections being hingedly coupled to a respective one of said first lateral edge and said second lateral edge, said upper surface of each of said foldable sections lying on a plane being coplanar with said top surface of said central portion when said foldable sections are positioned in said flattened position, each of said foldable sections extending upwardly from said central portion when said foldable sections are positioned in a folded position; and wherein said arm has a first end and a second end, said first end being associated with said first portion, said second end being associated with said second portion, said arm including a pivot being coupled between each of said first portion and said second portion, said pivot being rotatably disposed on said second portion thereby facilitating said first portion to be rotated about a longitudinal axis of said second portion, said first portion comprising a first half slidably receiving a second half such that said first portion has a telescopically adjustable length, said second end being coupled to said top surface of said central portion of said base having said second portion being oriented perpendicular to said top surface wherein said second portion is configured to extend upwardly between the respective pair of cushions.

2. The assembly according to claim 1, wherein said first portion includes a sleeve being coupled between said first half and said second half, said sleeve frictionally engaging said first portion and said second portion when said sleeve is rotated in a tightening direction for retaining said first portion at a desired length, said sleeve being disengaged from said first half and said second half when said sleeve is rotated in a loosening direction to facilitate said first portion to be lengthened or shortened.

3. The assembly according to claim 1, wherein:

said assembly includes a universal joint having a primary portion movably engaging a secondary portion, said primary portion being coupled to said first end of said first portion of said arm; and said holder comprises a panel having a first surface, a second surface and a perimeter edge, said perimeter edge having a first lateral side and a second lateral side, said secondary portion of said universal joint being coupled to said first surface of said panel wherein said second surface is configured to have the smart device positioned against the second surface; and said panel has a pair of clips each being disposed on a respective one of said first lateral side and said second lateral side of said perimeter edge, each of said clips extending away from said second surface of said panel wherein each of said clips is configured to releasably engage the smart device to retain the smart device on said holder, each of said clips curving toward each other thereby facilitating each of said clips to be biased into a gripping condition.

4. A smart device holder assembly for holding a smart device on a cushioned article of furniture, said assembly comprising:

a base having a pair of foldable sections, each of said foldable sections being positionable in a flattened position wherein said base is configured to be positioned beneath cushions on an article of furniture, said base including a central portion having a first lateral edge, a second lateral edge and a top surface, each of said foldable sections having a first sidelong edge and an upper surface, said first sidelong edge of each of said foldable sections being hingedly coupled to a respective one of said first lateral edge and said second lateral edge, said upper surface of each of said foldable sections lying on a plane being coplanar with said top surface of said central portion when said foldable sections are positioned in said flattened position, each of said foldable sections extending upwardly from said central portion when said foldable sections are positioned in a folded position;

an arm being coupled to and extending away from said base wherein said arm is configured to extend upwardly between a respective pair of cushions on the article of furniture when said base is positioned beneath the cushions, said arm having a first portion being pivotally coupled to a second portion such that said first portion is positionable at a variety of angles with respect to said second portion, said arm having a first end and a second end, said first end being associated with said first portion, said second end being associated with said second portion, said arm including a pivot being coupled between each of said first portion and said second portion, said pivot being rotatably disposed on said second portion thereby facilitating said first portion to be rotated about a longitudinal axis of said second portion, said first portion comprising a first half slidably receiving a second half such that said first portion has a telescopically adjustable length, said second end being coupled to said top surface of said central portion of said base having said second portion being oriented perpendicular to said top surface wherein said second portion is configured to extend upwardly between the respective pair of cushions, said first portion including a sleeve being coupled between said first half and said second half, said sleeve frictionally engaging said first portion and said second portion when said sleeve is rotated in a tightening direction for retaining said first portion at a desired length, said sleeve being disengaged from said first half and said second half when said sleeve is rotated in a loosening direction to facilitate said first portion to be lengthened or shortened;

a universal joint having a primary portion movably engaging a secondary portion, said primary portion being coupled to said first end of said first portion of said arm; and a holder being movably disposed on said arm wherein said holder is configured to hold a smart device in a preferred orientation above the cushions on the article of furniture, said holder comprising a panel having a first surface, a second surface and a perimeter edge, said perimeter edge having a first lateral side and a second lateral side, said secondary portion of said universal joint being coupled to said first surface of said panel wherein said second surface is configured to have the smart device positioned against the second surface, said panel having a pair of clips each being disposed on a respective one of said first lateral side and said second lateral side of said perimeter edge, each of said clips extending away from said second surface of said panel wherein each of said clips is configured to releasably engage the smart device to retain the smart device on said holder, each of said clips curving toward each other thereby facilitating each of said clips to be biased into a gripping condition.

* * * * *